United States Patent [19]
Watanabe

[11] Patent Number: 5,499,345
[45] Date of Patent: Mar. 12, 1996

[54] BUS ARBITRATION SYSTEM

[75] Inventor: Yoshikazu Watanabe, Tokyo, Japan

[73] Assignee: NEC Corporation, Tokyo, Japan

[21] Appl. No.: 405,406

[22] Filed: Mar. 15, 1995

Related U.S. Application Data

[63] Continuation of Ser. No. 955,975, Oct. 2, 1992, abandoned.

[30] Foreign Application Priority Data

Oct. 2, 1991 [JP] Japan ................................. 3-282110

[51] Int. Cl.⁶ ..................................................... G06F 13/36
[52] U.S. Cl. ..................................... 395/297; 364/DIG. 1; 364/230; 364/231.4; 364/242.6; 364/242.8; 364/270.1
[58] Field of Search ...................................... 395/297, 861, 395/865, 299

[56] References Cited

U.S. PATENT DOCUMENTS

| | | | |
|---|---|---|---|
| 3,761,879 | 9/1973 | Brandsma et al. | 395/325 |
| 4,096,571 | 6/1978 | Vander mey | 395/425 |
| 4,458,314 | 7/1984 | Grimes | 395/325 |
| 4,481,572 | 11/1984 | Ochsner | 395/325 |
| 4,481,583 | 11/1984 | Muller | 395/725 |
| 4,488,218 | 12/1984 | Grimes | 395/325 |
| 4,675,812 | 6/1987 | Capowski et al. | 395/550 |
| 4,719,567 | 6/1988 | Whittington et al. | 395/325 |
| 4,789,926 | 12/1988 | Clarke | 395/325 |
| 4,969,120 | 11/1990 | Azevedo et al. | 395/325 |
| 5,034,881 | 7/1991 | Hoashi et al. | 395/325 |
| 5,099,420 | 3/1992 | Barlow et al. | 395/299 |
| 5,193,179 | 3/1993 | Laprade et al. | 395/184.01 |
| 5,230,044 | 7/1993 | Cao et al. | 395/325 |
| 5,241,632 | 8/1993 | O'Connell et al. | 395/325 |

FOREIGN PATENT DOCUMENTS 62-229353  8/1987  Japan .

Primary Examiner—Jack B. Harvey
Assistant Examiner—Ayaz R. Sheikh
Attorney, Agent, or Firm—Sughrue, Mion, Zinn, Macpeak & Seas

[57] ABSTRACT

A bus arbitration system for a data processing apparatus to which a plurality of bus masters are connected. The counter section counts the duration of bus occupation of the bus masters. The arbitrating section of the apparatus monitors whether the bus is occupied. If the bus is not occupied, the bus occupation times of the bus masters with valid request signals are compared. Priority is then given to the bus master with the shortest occupation time unless the occupation times are equal, in which case, priority is given in a predetermined order. An initializing section initializes the counter section at a predetermined interval.

9 Claims, 7 Drawing Sheets

BUS ARBITRATION SYSTEM

This is a continuation of application No. 07/955,975 filed Oct. 2, 1992 now abandoned.

BACKGROUND OF THE INVENTION

The present invention relates to a data processing apparatus and, more particularly, to a bus arbitration system for a data processing apparatus to which a plurality of bus masters of relatively low degrees of priority are connected.

Conventional bus arbitration systems for the above application are disclosed in, for example, Japanese Patent Application Disclosure No. Sho 62-229353.

The above document discloses three different conventional systems, i.e., a first system using a daisy chain system, a second system using a priority arbitration system, and a third system using a round robin system. The daisy chain system connects a plurality of bus masters in series and gives the highest priority to the electrically uppermost bus master. The priority arbitration system connects a plurality of bus masters in parallel, inputs to a bus arbiter bus request signals which are outputted by the bus masters in synchronism, and sequentially selects the bus masters according to a predetermined priority order to give them an allowance signal. Further, the round robin system causes a bus arbiter to cyclically scan bus masters to see if any one of them is outputting a bus request signal, give an allowance signal to the bus master outputting a bus request signal on detecting such a bus master, and handles this bus master as a bus master of lowest priority at the time of the next bus arbitration.

The above-described conventional bus arbitration systems have the following problems.

To begin with, a problem with the first conventional system is that the arbitration processing time increases with the increase in the number of bus masters. Another problem is that the priority order among the bus masters is fixedly determined by their connecting positions.

The second conventional system is disadvantageous in that since the priority order for dealing with the request signals from the bus masters is predetermined, an allowance signal is given only to a bus master having high priority.

Regarding the third conventional system, assume that a plurality of bus masters are far different from one another with respect to the duration of bus occupation. Then, when an allowance is given to the bus master which occupies the bus over the longest period of time, the bus arbitration is partial from the standpoint of bus occupation ratio.

SUMMARY OF THE INVENTION

It is therefore an object of the present invention to provide a bus arbitration system capable of effecting impartial arbitration in respect of bus occupation ratio.

BRIEF DESCRIPTION OF THE DRAWINGS

The above and other objects, features and advantages of the present invention will become more apparent from the following detailed description taken with the accompanying drawings in which.

In the figures, the same reference numerals designate the same parts or elements.

DETAILED DESCRIPTION OF THE PREFERRED EMBODIMENT

Figure 1:
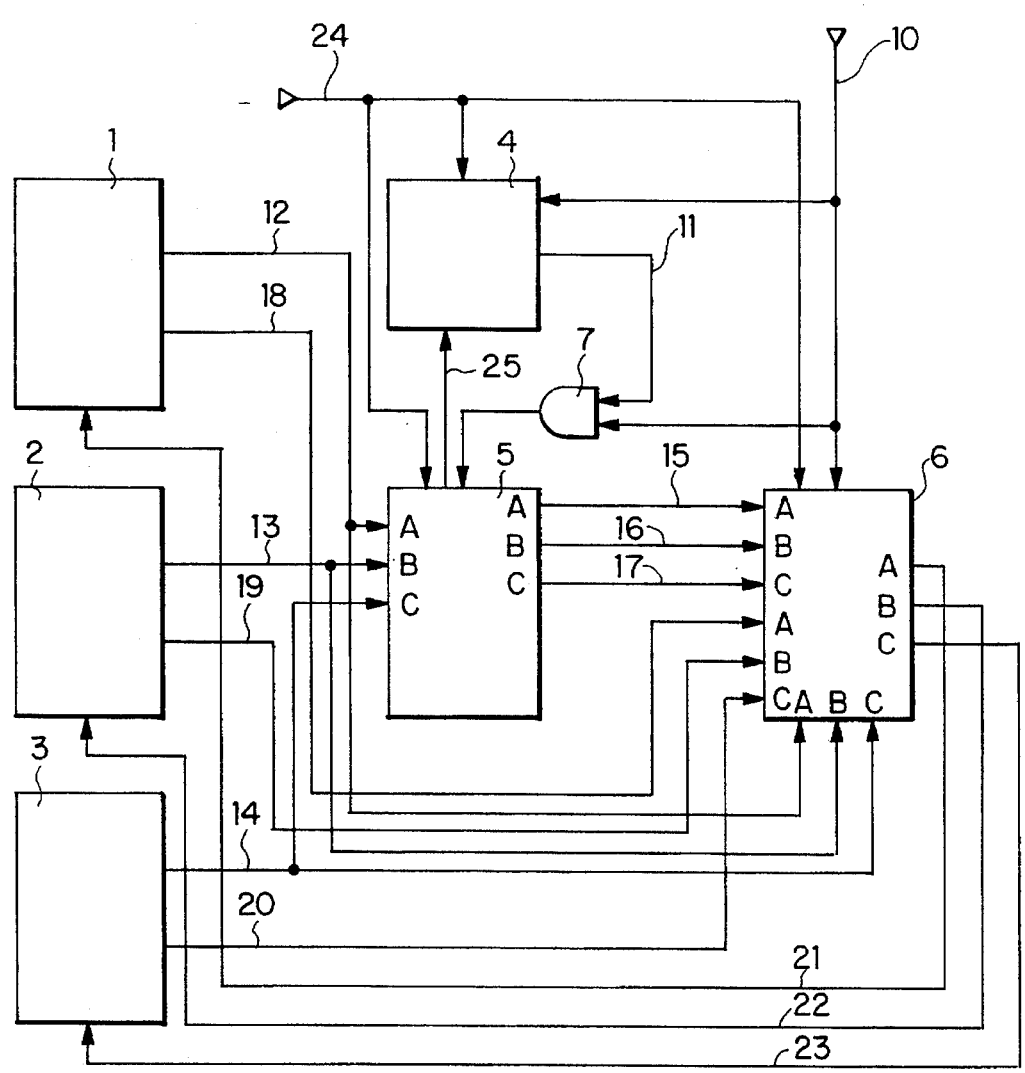
FIG. 1 is a block diagram schematically showing a bus arbitration system embodying the present invention.

Referring to FIG. 1 of the drawings, a bus arbitration system embodying the present invention has a bus master A 1, a bus masters B 2, a bus master C 3, a counter section 5 for counting each of the duration of bus occupation, i.e., bus occupation times of the bus masters, a bus arbiter section 6 for giving an allowance signal (referred to as a bus ACK signal) to a particular bus master selected on the basis of the bus occupation times from the counter 5 and bus request signals from the bus masters, a counter initialization control section 4 for initializing the counter section 5 every predetermined period of time, and an AND gate 7.

The counter initialization control 4 is initialized by a power on reset signal 10. As a timer built in the control 4 section counts a predetermined period of time in response to a bus clock 24, the control section 4 generates a counter reset signal 11.

Figure 3:
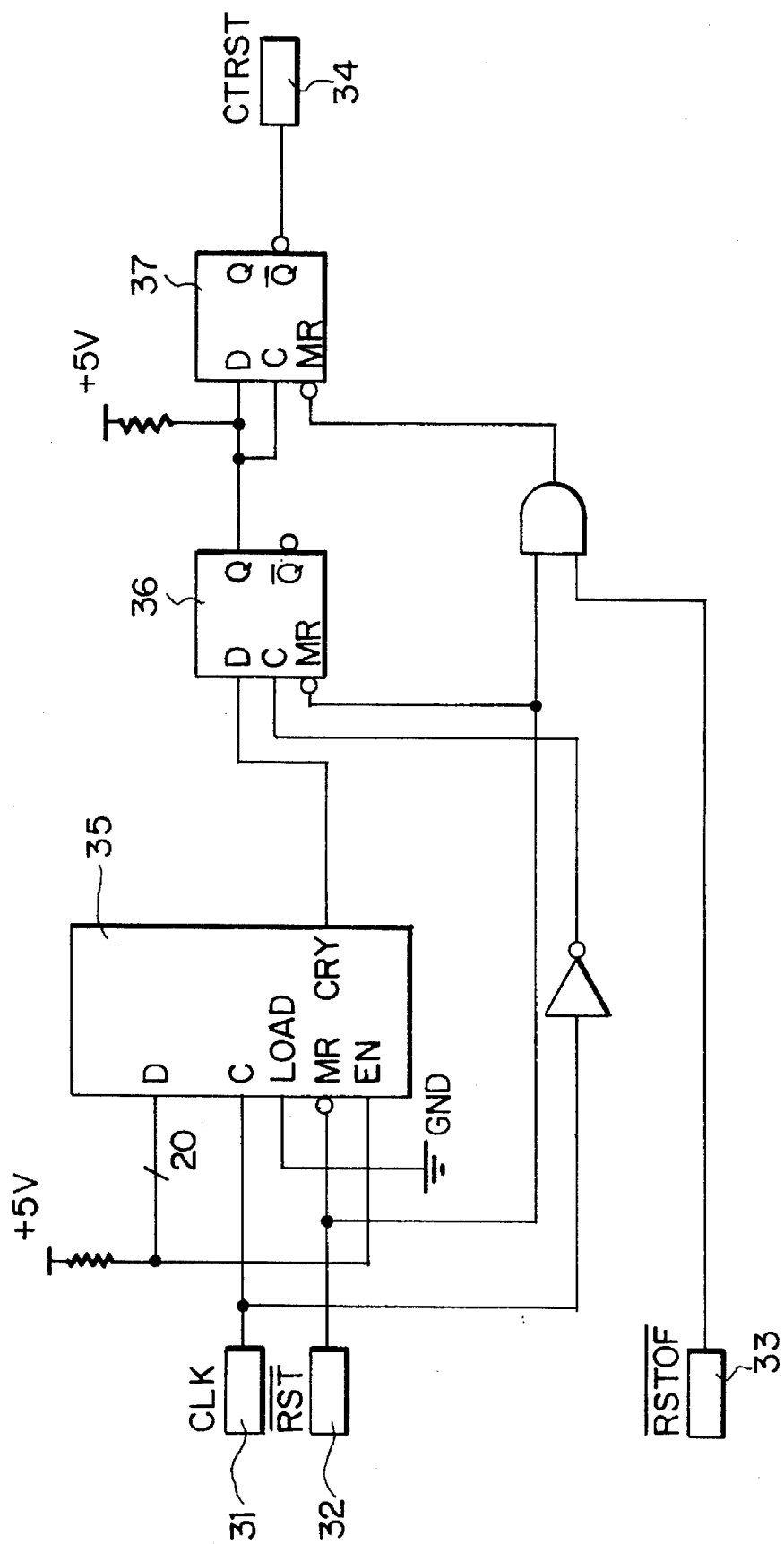
FIG. 3 shows a specific construction of a counter initialization control section included in the embodiment.

FIG. 3 shows a specific construction of the counter initialization control 4 section. As shown, the control section 4 is made up of a clock input terminal 31, a reset input terminal 32 for receiving the power on reset signal, a counter reset off signal input terminal 33, a counter reset signal output terminal 34, a 20-bit counter 35 for determining the interval between consecutive resetting of the counter 5, and flip-flops 36 and 37 for controlling the timing for outputting the counter reset signal.

The operation of the counter initialization control section 4 will be described hereinafter.

On the turn-on of the power supply, the power on reset signal 10 is inputted to the control section 4 to initialize the counter 35. Then, the counter 35 starts counting time in response to the bus clock 24 coming in through the clock input terminal 31. On fully counting time over the entire twenty bits thereof, the counter 35 validates a carry signal. The carry signal is controlled by the flip-flops 36 and 37 to be delivered via an output terminal 34 as the counter reset signal 11. By repeating such a procedure, the control section 4 generates a counter reset signal every predetermined period.

The counter section 5 has counters each being assigned to one of the bus masters A 1, B 2 and C 3 for counting the duration of bus occupation or bus occupation time. On receiving bus enable signals 12, 13 and 14 from the bus masters A 1, B 2 and C 3, respectively, the counter section 5 causes each of the counters to up-count in response to the bus clock 24 and only while the associated bus enable signal is valid. The counts of these counters are respectively outputted as a bus occupation time 15 of the bus master A 1, a bus occupation time 16 of the bus master B 2, and a bus occupation time 17 of the bus master C 3. Such counters are each initialized by the counter reset signal 11 from the initialization control section 4 and power on reset signal 10.

Figure 4:
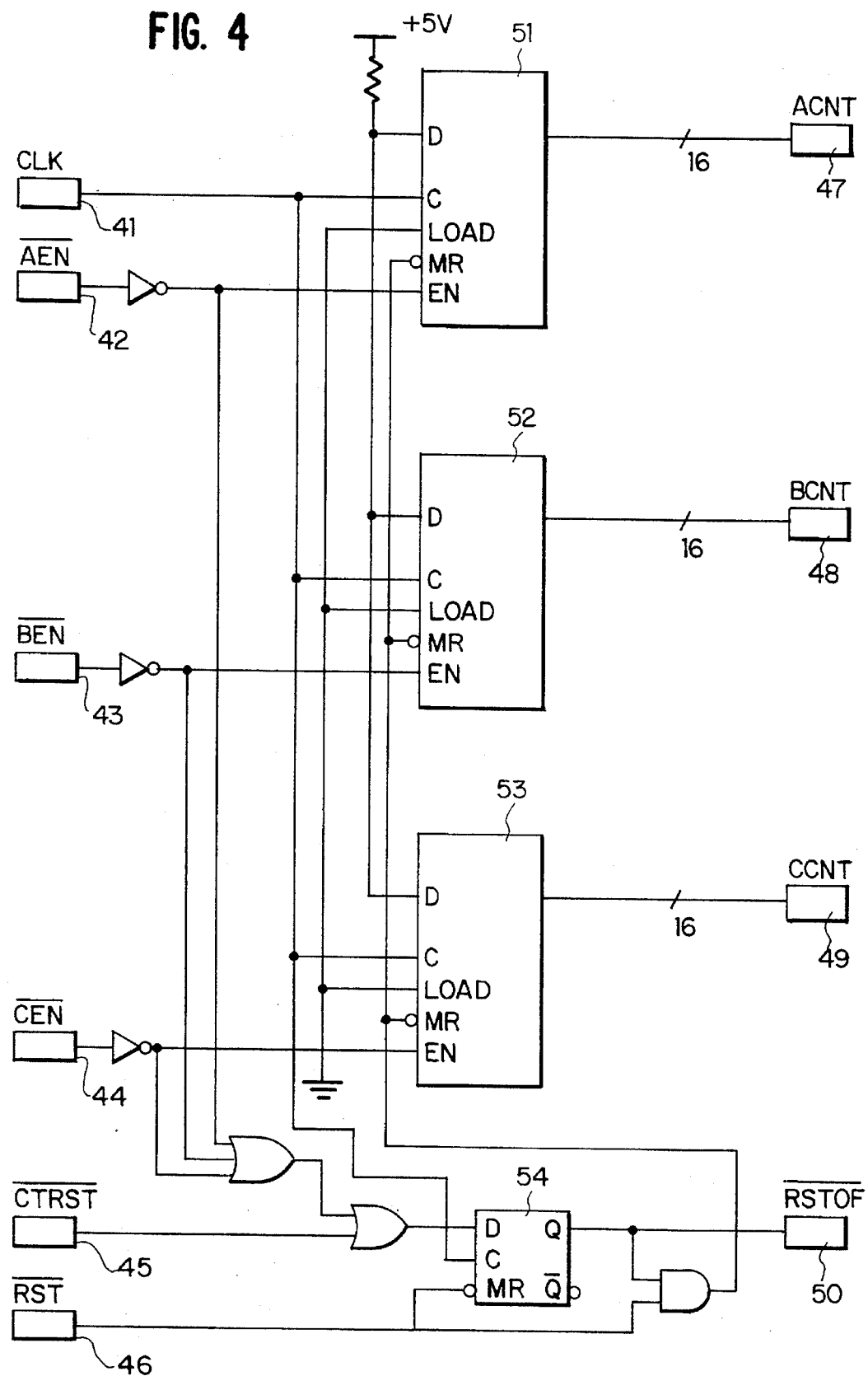
FIG. 4 shows a specific construction of a counter section also included in the embodiment.

As shown in FIG. 4 specifically, the counter section 5 has a clock input terminal 41, an input terminal 42 for receiving the bus enable signal from the bus master A 1, an input terminal 43 for receiving the bus enable signal from the bus master B 2, an input signal 44 for receiving the bus enable signal from the bus master C 3, an input terminal 45 for receiving the counter reset signal from the counter initialization control section 4, an input terminal 46 for receiving the power on reset signal, an output terminal 47 for outputting the count of the bus enable signal from the bus master A 1, an output terminal 48 for outputting the count of the bus enable signal from the bus master B 2, an output terminal 49 for outputting the count of the bus enable signal from the bus master C 3, an output terminal 50 for outputting the counter reset off signal 25 to be used by the control section 4, a counter 51 for counting the bus enable signal from the bus master A 1, a counter 52 for counting the bus enable signal from the bus master B 2, a counter 53 for counting the bus enable signal from the bus master C 3, and a flip-flop 54 for generating the counter reset off signal 25 which invalidates the counter reset signal.

The counter section 5 is operated as follows.

The counters 51, 52 and 53 each up-counts in response to the bus clock signal from the clock input terminal 41 when the signal coming in through the associated bus enable signal input terminal 42, 43 or 44 is valid, i.e., in a high level. To reset the counters 51, 52 and 53, a signal generated on the basis of the signal from the counter reset signal input terminal 45 and the signal from the power on reset signal input terminal 46 is controlled by the flip-flop 54 and then applied to the counters 51, 52 and 53. When one of the bus masters A 1, B 2 and C 3 validates the bus enable signal thereof, i.e., the associated counter is in operation, the reset signal from the counter reset signal input terminal 45 is masked; it is validated after the operation of the counter.

As the bus arbiter section 6 is initialized by the power on reset signal 10, it executes bus arbitration processing on the basis of the bus request signals 18, 19 and 20 from the bus masters A 1, B 2 and C 3 and the bus occupation times 15, 16 and 17 from the counter section 5. The bus arbiter section 6 has a comparing section 610, FIG. 5, a priority determining section 620, FIG. 6, and an arbitrating section 630, FIG. 7.

How the bus arbiter section 6 performs bus arbitration will be described.

The bus arbiter section 6 monitors the bus enable signals 12, 13 and 14 from the bus masters A 1, B 2 and C 3, respectively, so as to check the occupation state of the bus. When the bus is not occupied, the arbiter section 6 samples the bus request signals 18, 19 and 20 from the bus masters in response to the bus clock signal 24. If only one of the bus request signals is valid, the arbiter section 6 validates, with no regard to the values of the bus occupation times 15, 16 and 17, one of the bus ACK signals 21, 22 and 23 associated with the bus master which validated the bus request signal.

When two or more of the bus request signals 18, 19 and 20 are valid as determined by the sampling, the bus arbiter section 6 compares, among the bus occupation times 15, 16 and 17, those associated with the conflicting bus masters. Then, the arbiter section 6 gives an acknowledgement to one of the conflicting bus masters which is shorter in bus occupation time than the other or others. If all the bus occupation times are equal, the arbiter section 6 gives an acknowledgement to the bus masters A 1, B 2 and C 3 in this order. Therefore, when the bus is occupied, i.e., when any one of the bus enable signals 12, 13 and 14 is valid, none of the bus ACK signals 21, 22 and 23 becomes valid.

Figure 5:
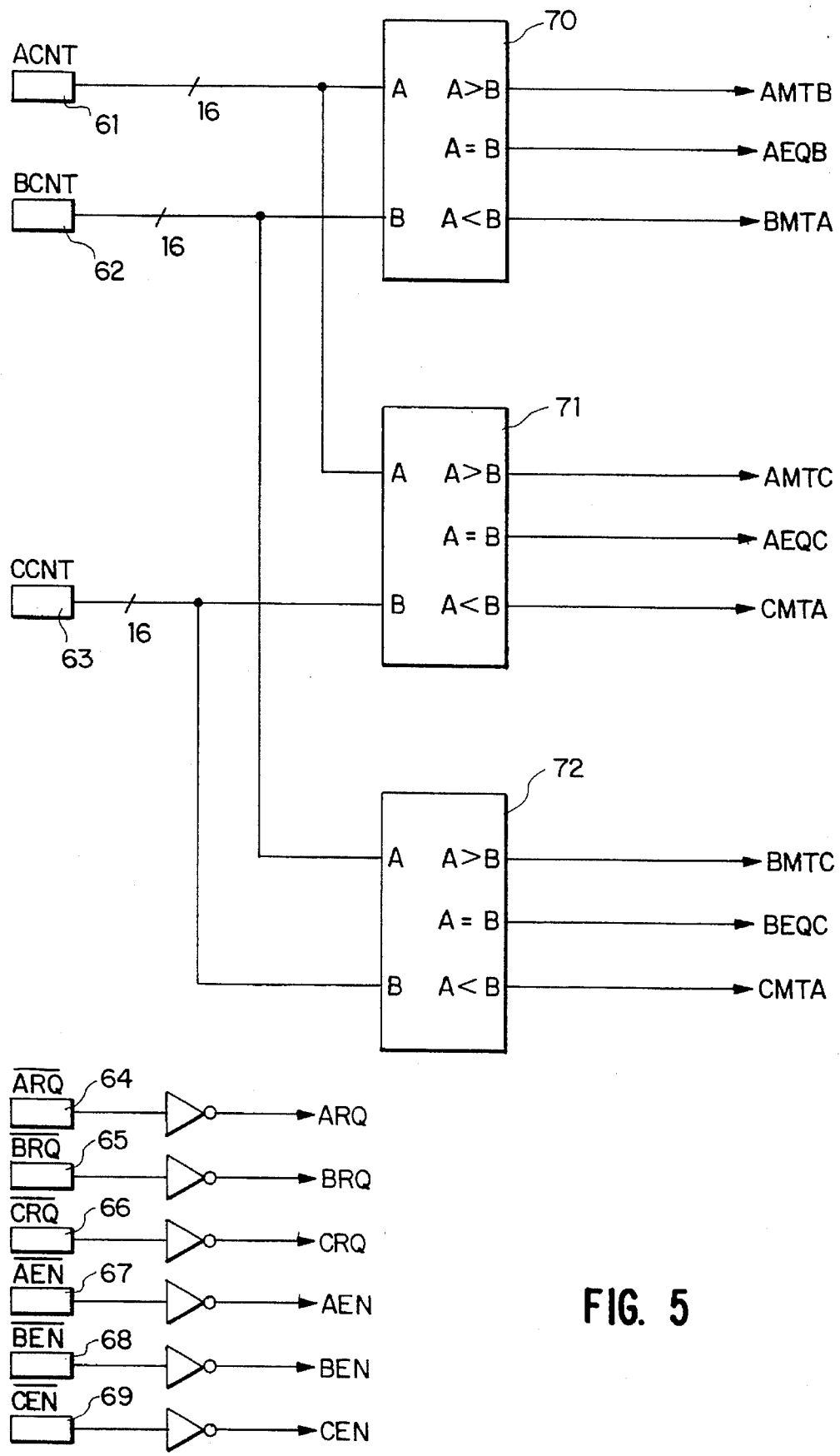
FIG. 5 shows a specific construction of a comparing circuit included in a bus arbiter section which forms part of the embodiment.

As shown in FIG. 5, the comparing section 610 has an input terminal 61 for receiving the bus occupation time of the bus master A 1 from the counter section 5, an input terminal 62 for receiving the bus occupation time of the bus master B 2 from the counter 5, an input terminal 63 for receiving the bus occupation time of the bus master C 3 from the counter section 5, input terminals 64, 65 and 66 for receiving respectively the bus request signals from the bus masters A 1, B 2 and B 3, input terminals 67, 68 and 69 for receiving respectively the bus enable signals from the bus masters A 1, B 2 and C 3, a magnitude comparator 70 for comparing the bus occupation times of the bus masters A 1 and B 2, a magnitude comparator 71 for comparing the bus occupation times of the bus masters A 1 and C 3, and a magnitude comparator 72 for comparing the bus occupation times of the bus masters B 2 and C 3.

Figure 6:
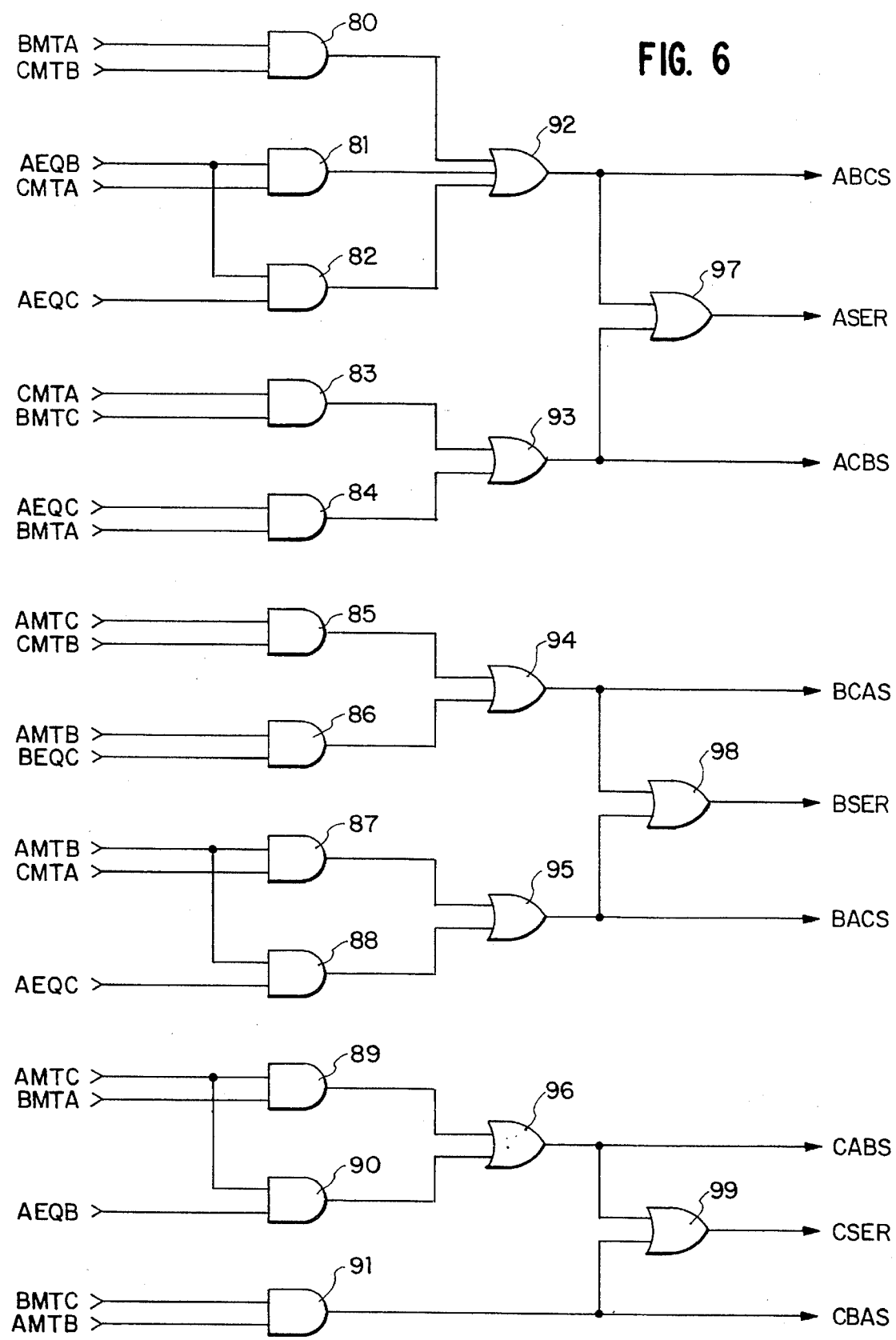
FIG. 6 shows a specific construction of a priority order determining circuit also included in the bus arbiter section.

As shown in FIG. 6, the priority determining section 620 has AND gates 80–91 and OR gates 92–99. In response to the output of the comparing section 610, the priority determining section 620 determines the priority order of the bus masters A 1, B 2 and C 3.

Figure 7:
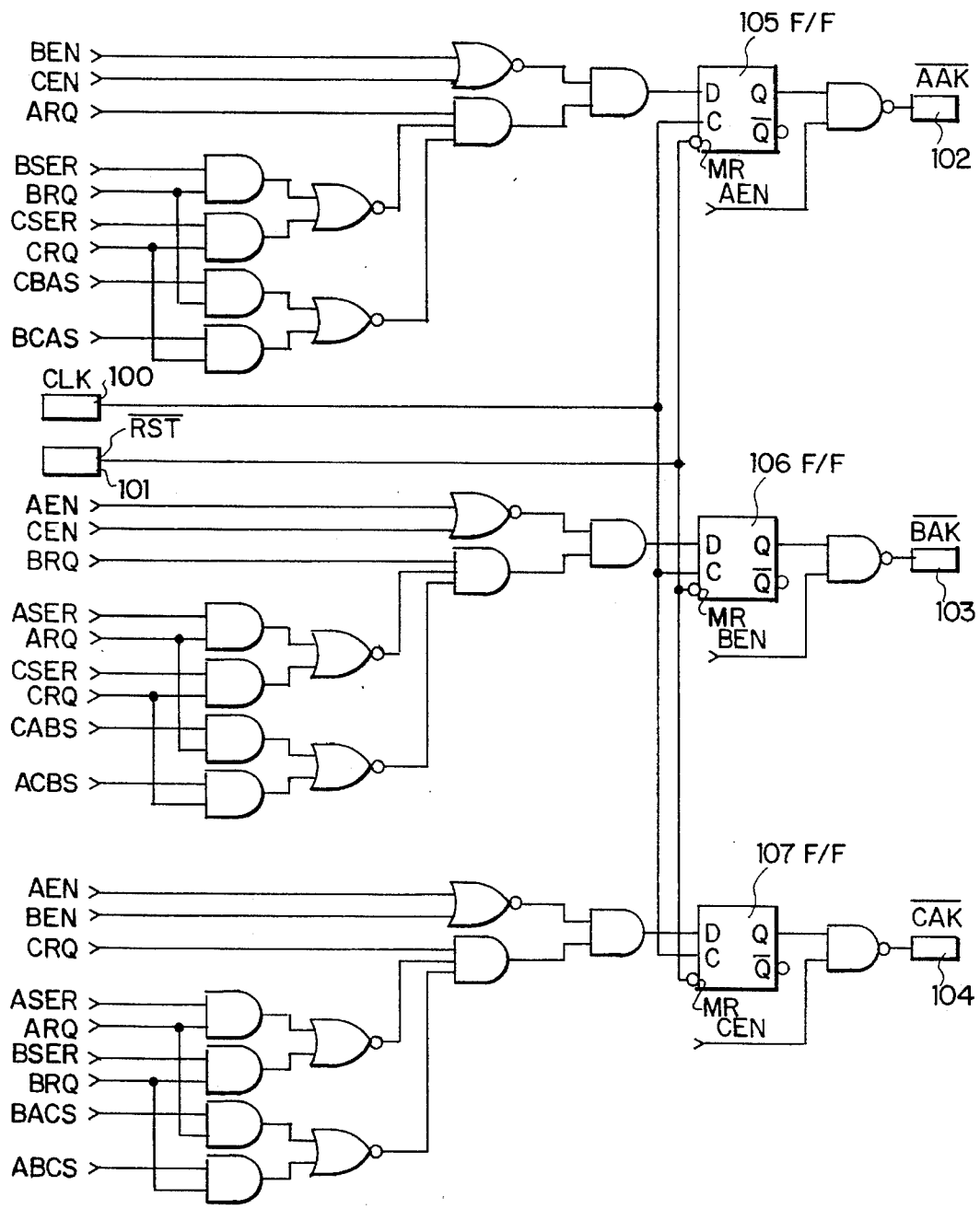
FIG. 7 shows a specific construction of an arbiter included in the bus arbiter section.

As shown in FIG. 7, the arbitrating section 630 has a clock input terminal 100, a power on reset signal input terminal 101, an output terminal 102 for delivering a bus ACK signal to the bus master A 1, an output terminal 103 for delivering a bus ACK signal to the bus master B 2, an output terminal 104 for delivering a bus ACK signal to the bus master C 2, and flip-flops 105, 106 and 107 for generating respectively the timings for outputting bus ACK signals to the bus masters A 1, B 2 and C 3.

The operation of the bus arbiter section 6 is as follows.

The bus occupation times of the bus masters are fed to the bus arbiter section 6 via the input terminals 61, 62 and 63 on a real time basis. The priority order of the bus masters A 1, B 2 and C 3 is determined according to the results of comparison from the comparators 70, 71 and 72 and the priority order from the priority order determining section 620, FIG. 6. Then, a bus ACK signal is fed to one of the bus masters on the basis of the bus request signals on the input terminals 64, 65 and 66, FIG. 5 and the above-mentioned priority order. Assume that the bus occupation times of the bus masters A 1, B 2 and C 3 are equal, priority is given to the bus masters A 1, B 2 and C 3 in this order. At this instant, if the bus request signals from the bus masters A 1, B 2 and C 3 arrive at the same time, the flip-flop 105, FIG. 7, samples the request signal from the bus master A 1 while the flip-flops 106 and 107 masks the request signals from the bus masters B 2 and C 3, respectively. As a result, a bus ACK signal 21 is fed to the bus master A 1 via the output terminal 102. In response to the signal 21, the bus master A 1 validates the bus enable signal 12 thereof to use the bus. While the bus enable signal 21 from the bus master A 1 is valid, the counter section 4, FIG. 4, up-counts the bus occupation time of the bus master A 1. As the bus occupation time of the master A 1 is inputted via the input terminal 61, FIG. 5, and compared by the comparators 70, 71 and 72, the priority order is changed to the bus masters B 2, C 3 and A 1. When the bus master A 1 ends occupying the bus, the request signal from the bus master A 1 becomes invalid. As a result, the request signal from the bus master B 2 become valid with the request signal from the bus master C 3 being masked and is sampled by the flip-flop 106. Subsequently, a bus ACK signal 22 is sent to the bus master B 2 via the output terminal 103, FIG. 7. As the bus master B 2 ends using the bus, the priority order is changed to the bus masters C 3, B 2 and A 1 or bus masters C 3, A 1 and B 2. Then, a bus ACK signal 23 is sent to the bus master C 3 via the output terminal 104, FIG. 7, allowing it to start occupying the bus.

The operation of the embodiment will be described in detail with reference to the drawings.

Figure 2:
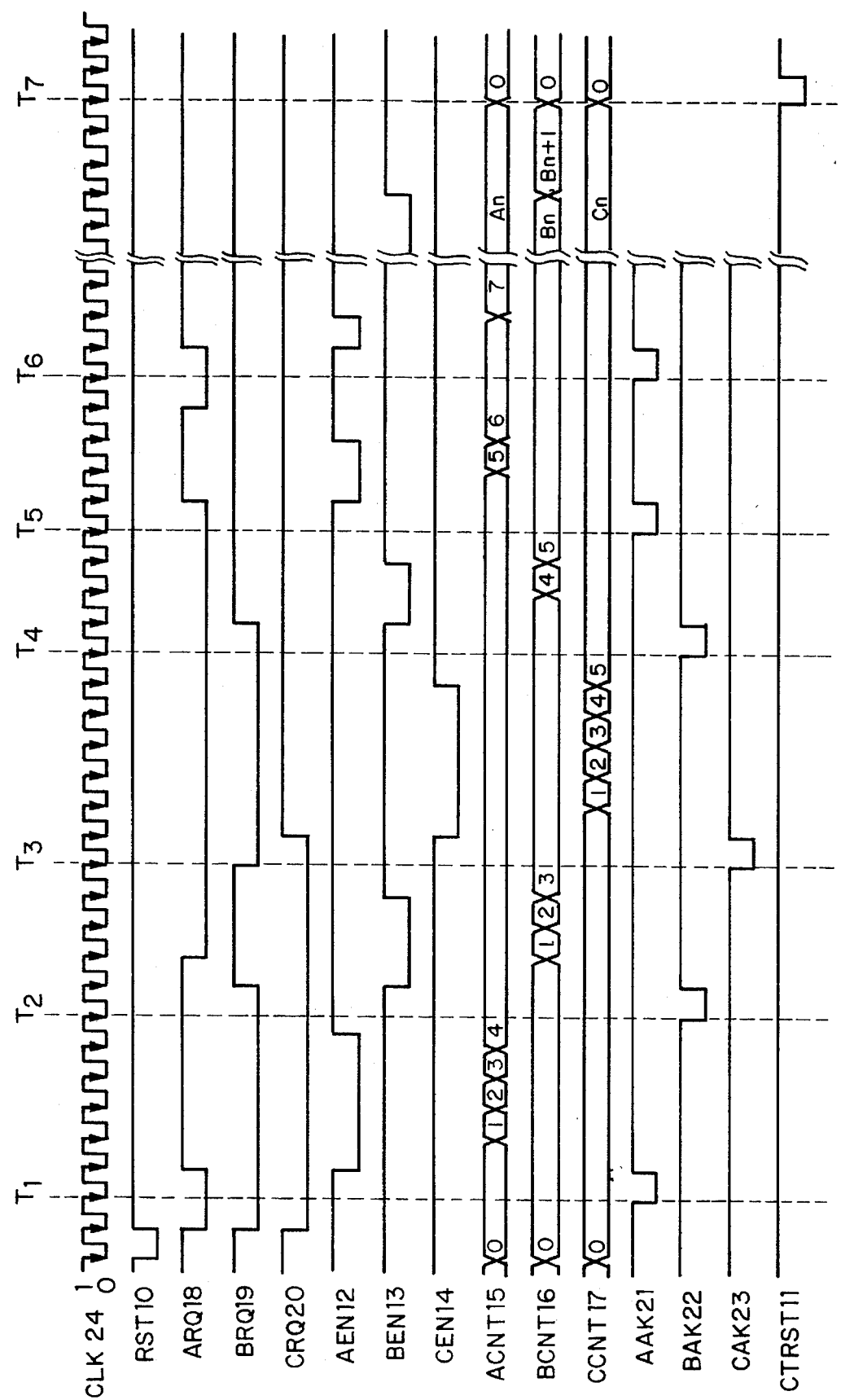
FIG. 2 is a timing chart representative of a specific operation of the embodiment.

FIG. 2 shows specific waveforms representative of the bus clock signal CLK 24, power on reset signal RST 10, bus request signal ARQ 18, bus request signal BRQ 19, bus request signal CRQ 20, bus enable signal AEN 12, bus enable signal BEN 13, bus enable signal CEN 14, bus occupation time ACNT 15 of the bus master A 1, bus occupation time BCNT 16 of the bus master B 2, bus occupation time CCNT 17 of the bus master C 3, bus ACK signal AAK 21, bus ACK signal BAK 22, bus ACK signal CAK 23, and counter reset signal CTRST 11. In all the signals, the valid polarity is assumed to be "0".

First, on the start-up of the system, the power on reset signal 10 is validated to initialize the counter initialization control section 4, counter section 5, and bus arbiter section 6. On the cancellation of the power on reset signal 10, the bus request signals ARQ 18, BRQ 19 and CRQ 20 associated with the bus masters A 1, B 2 and C 3, respectively, are validated at the same time. At a sampling point T1 of the bus clock signal CLK 24, the bus occupation times ACNT 15, BCNT 16 and CCNT 17 associated with the bus masters A 1, B 2 and C 3, respectively, are compared. At this instant, since all the values are "0", the predetermined priority of bus masters A 1, B 2 and C 3 is set up. Then, the bus arbiter section 6 validates the bus ACK signal AAK 21 meant for the bus master A 1, and the bus master A 1 in turn validates the bus enable signal AEN 12.

On receiving the bus enable signal AEN 12, the counter section 5 up-counts the bus occupation time ACNT 15 of the bus master A 1 in response to the bus clock signal 24 while the signal 12 is valid. During this period of time, the request signals BRQ 19 and CRQ 20 associated with the bus masters B 2 and C 3, respectively, remain valid until the bus can be used. As the bus master A 1 ends occupying the bus, arbitration for the bus masters B 2 and C 3 is effected at a sampling point T2 of the bus clock signal CLK 24. In this case, since both of the bus occupation times BCNT 16 and CCNT 17 are "0", priority is given to the bus master B 2 over the bus master C 3. Subsequently, the bus enable signal BEN 13 of the bus master 2 is validated. While the signal BEN 13 is valid, the bus occupation time BCNT 16 of the bus master B 2 is up-counted in response to the bus clock signal CLK 24.

As the bus master B 2 ends using the bus, arbitration for the bus masters A 1 and C 3 is effected at a sampling point T3 of the bus clock signal CLK 24. At this instant, since the bus occupation time of the bus master A 1 is "4" and that of the bus master C 3 is "0", the bus master C 3 shorter in bus occupation time than the bus master A 1 is allowed to use the bus.

On the completion of occupation of the bus by the bus master C 3, the bus masters A 1 and B 2 are arbitrated at a sampling point T4 of the bus clock CLK 24. Since the bus occupation time BCNT 16 of the bus master B 2 is shorter than that of the bus master A 1, priority is given to the bus master B 2.

When the bus master B 2 ends using the bus, the bus master A 1 is allowed to use the bus at a sampling point T5 of the bus clock signal CLK.

At a sampling point T6 of the bus clock signal CLK 24, since only the bus request signal ARQ 18 is valid the bus master A 1 is allowed to use the bus unconditionally, i.e., with no regard to the bus occupation time thereof.

The above-described procedure is repeated to give allowance to one of the bus masters having a shorter bus occupation time than the others.

The counters 51, 52 and 53 of the counter section 5 are initialized every predetermined period of time which is determined by the counter reset signal CTRST 11. Specifically, at a sampling point T7 of the bus clock signal CLK 24, the counters associated with the bus masters are initialized to "0" by the counter reset signal CTRST 11.

While the embodiment is shown and described as accommodating three bus masters, it will be apparent that the present invention is applicable to a system having a greater number of bus masters with a similar construction and arrangement.

While the present invention has been described in conjunction with the preferred embodiments thereof, it will now be readily possible for those skilled in the art to put this invention into practice in various other manners.

What is claimed is:

1. A bus arbitration system for assigning priority of bus occupation among a plurality of bus masters so as to even the occupancy periods of the bus by the plurality of bus masters, said system comprising:

counting means connected to said plurality of bus masters for individually counting durations of real bus occupation by respective ones of said plurality of bus masters; and bus arbitrating means connected to said counting means and said plurality of bus masters for giving, when at least two of said plurality of bus masters concurrently send valid bus request signals, priority to one of said plurality of bus masters having the shorter previous duration of bus occupation, as last counted by said counting means, and for giving priority in a predetermined order when immediately preceding durations of bus occupation by said at least two of said plurality of bus masters are equal.

2. A system as claimed in claim 1, further comprising initializing means connected to said counting means for initializing said counting means periodically after a predetermined period of time has elapsed.

3. A system as claimed in claim 2, wherein said initializing means comprises:

a counter initialized by a power on reset signal which is validated on the turn-on of a power supply, counts in response to a bus clock signal, and generates a carry signal on completing counting; and a flip-flop for generating a counter reset signal by controlling an output timing of the carry signal.

4. A system as claimed in claim 3, wherein said counting means comprises:

a plurality of counters each being assigned to one of said plurality of bus masters for counting an enable signal from the associated bus master; and a flip-flop responsive to the counter reset signal from said initializing means and the power on reset signal for generating a signal which invalidates said counter reset signal, and sending said signal to said initializing means.

5. A system as claimed in claim 2, wherein said bus arbitrating means comprises:

comparing means for comparing said durations of bus occupation of said plurality of bus masters;

priority determining means for determining a priority order of said plurality of bus masters according to a plurality of results of comparison from said comparing means, giving priority to one of said plurality of bus masters having the shorter duration of bus occupation as counted by said counting means, and when said durations of bus occupation are equal, giving priority in a predetermined order; and arbitrating means delivering a bus ACK signal to one of said plurality of bus masters according to said priority order from said priority determining means, wherein an arrival of said ACK signal causes an associated bus master to validate a bus enable signal to occupy the bus.

6. A system as claimed in claim 5, wherein said comparing means comprises:

a plurality of input terminals each receiving the bus occupation time of an associated bus master from said counting means; and a plurality of magnitude comparators for comparing bus occupation times of said plurality of bus masters, each magnitude comparator comparing the bus occupation times of a pair of bus masters.

7. A system as claimed in claim 5, wherein said priority determining means comprises:

a plurality of AND gates and OR gates which determines the priority order of the bus masters in response to the results of comparison of the said comparing section, said plurality of AND gates and OR gates giving priority to the bus master with the smallest occupation time, and when bus occupation times are equal among the bus masters, giving priority in a predetermined order.

8. A system as claimed in claim 5, wherein said arbitrating means comprises:

a plurality of AND gates and OR gates for determining which bus master receives a bus ACK signal in response to the priority order from said priority determining means;

a plurality of input terminals for receiving the bus enable signals from said plurality of bus masters so as to monitor the occupation state of the bus;

a clock input terminal for generating a clock signal;

a plurality of flip-flops generating the timings for outputting bus ACK signals to said plurality of bus masters, by sampling bus request signals from the bus masters only when no bus enable signal is valid and in response to the clock signal from the clock input terminal;

a power on reset signal input terminal for generating a power on reset signal;

a plurality of input terminals for receiving the bus request signals from said plurality of bus masters which are sampled by said flip-flops, wherein said bus request signal is validated upon the cancellation of the power on reset signal;

and a plurality of output terminals for delivering said bus ACK signal to one of said plurality of bus masters, wherein the arrival of said ACK signal causes the associated bus master to validate a bus enable signal to occupy the bus.

9. A system as claimed in claim 2, wherein said bus arbitrating means comprises:

comparing means for comparing said duration of bus occupation of said plurality of bus masters by using a plurality of input terminals each receiving the bus occupation time of the associated bus master from said counting means, and a plurality of magnitude comparators for comparing bus occupation times of said plurality of bus masters, each magnitude comparator comparing the bus occupation times of a pair of bus masters;

priority determining means for determining a priority order of said plurality of bus masters according to a plurality of results of comparison from said comparing means by using a plurality of AND gates and OR gates which determines the priority order of the bus masters in response to the results of comparison of the said comparing means, which gives priority to the bus master with the smallest occupation time, and when said durations of bus occupation are equal among the bus masters, which gives priority in a predetermined order; and arbitrating means delivering a bus ACK signal to one of said plurality of bus masters according to the priority order from said priority determining means by using a plurality of AND gates and OR gates for determining which bus master receives a bus ACK signal in response to the priority order from said priority determining means, a plurality of input terminals for receiving the bus enable signals from said plurality of bus masters so as to monitor the occupation state of the bus, a clock input terminal for generating a clock signal, a plurality of flip-flops generating the timings for outputting bus ACK signals to said plurality of bus masters, by sampling bus request signals from the bus masters only when no bus enable signal is valid and in response to the clock signal from the clock input terminal, a power on reset signal input terminal for generating a power on reset signal, a plurality of input terminals for receiving the bus request signals from said plurality of bus masters which are sampled by said flip-flops, wherein said bus request signal is validated upon the cancellation of the power on reset signal, and a plurality of output terminals for delivering said bus ACK signal to one of said plurality of bus masters, wherein the arrival of said ACK signal causes the associated bus master to validate a bus enable signal to occupy the bus.

* * * * *